United States Patent [19]

Gruenberg et al.

[11] Patent Number: 5,011,198

[45] Date of Patent: Apr. 30, 1991

[54] HANDLE LATCH ASSEMBLY

[75] Inventors: Eric I. Gruenberg, Soquel; James R. Stewart, San Jose; James J. Halicho, Sunnyvale, both of Calif.

[73] Assignee: Apple Computer, Inc., Cupertino, Calif.

[21] Appl. No.: 341,048

[22] Filed: Apr. 20, 1989

[51] Int. Cl.$^5$ .................. E05C 9/02; B65D 25/28
[52] U.S. Cl. .................. 292/41; 292/DIG. 30; 190/115
[58] Field of Search .................. 292/30, 41, 127, 174, 292/DIG. 30; 400/693; 190/115, 116, 118, 119

[56] References Cited

U.S. PATENT DOCUMENTS

| 1,426,211 | 8/1922 | Pausin | 292/175 X |
| 1,521,572 | 12/1924 | Hammer et al. | 292/175 |
| 3,336,065 | 8/1967 | Roberson | 292/30 |
| 4,838,585 | 6/1989 | Jondrow | 292/8 |
| 4,895,231 | 1/1990 | Yamaguchi et al. | 190/119 X |

FOREIGN PATENT DOCUMENTS 1135144 8/1962 Fed. Rep. of Germany ... 292/DIG. 30

Primary Examiner—Richard E. Moore
Attorney, Agent, or Firm—Blakely, Sokoloff, Taylor & Zafman

[57] ABSTRACT

An improved handle and latch assembly for a portable personal computer. The computer includes a cover. To open the cover, the user grasps the handle and pushes it a slight distance toward the computer. The handle is slideably coupled to the cover of the personal computer. A locking member is moveably disposed within the cover. A pair of locking hooks extend out of the cover and engage with slots in the keyboard section of the computer. When the handle is moved inward, it contacts the locking member and moves it, thereby releasing the hooks, and allowing the cover to be opened.

13 Claims, 5 Drawing Sheets

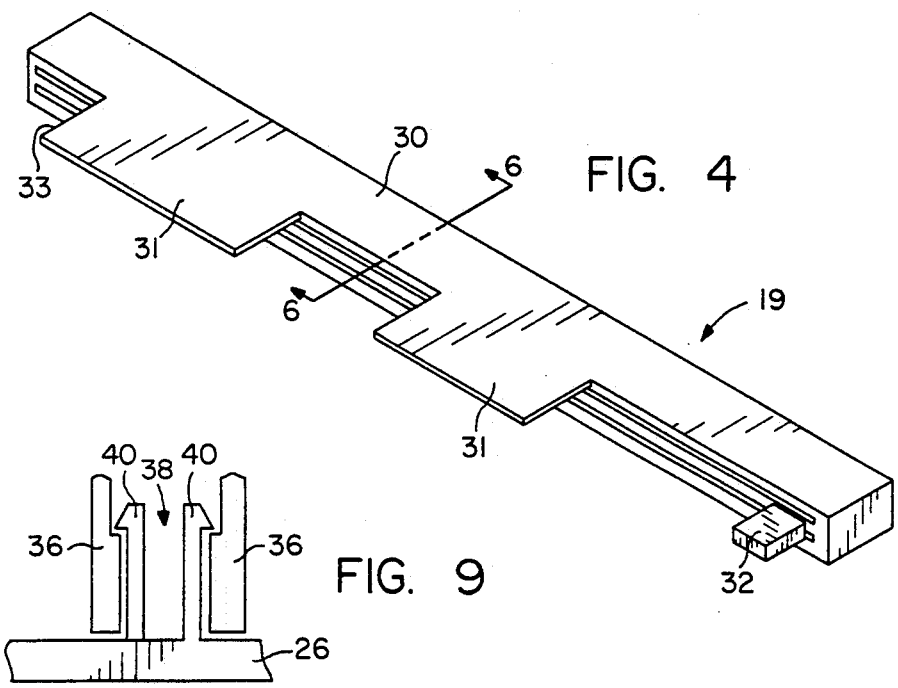
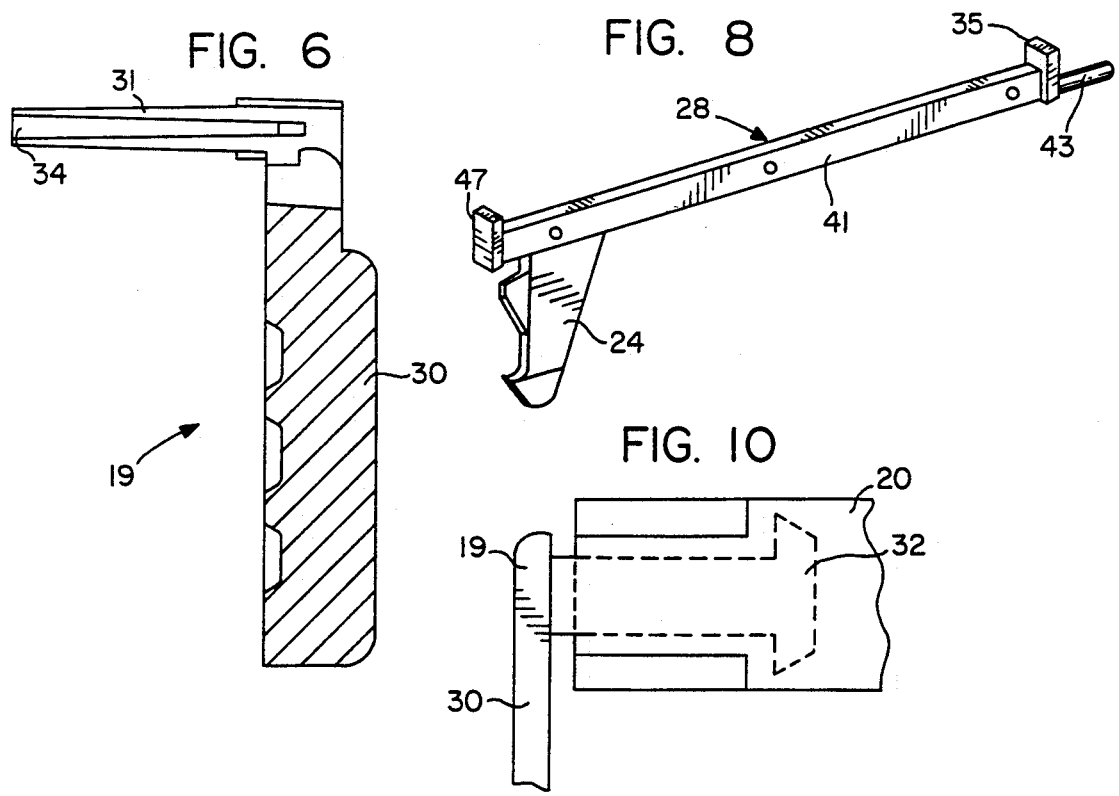

HANDLE LATCH ASSEMBLY

BACKGROUND OF THE INVENTION

A. Field of the Invention

The present invention relates to the field of latching devices, and more particularly to an improved handle and latch assembly for a portable personal computer.

B. Art Background

In the field of personal computers, computers which are portable and may easily be carried from place to place are commonly referred to as "lap-top" computers. Typically lap-top computers are compact in size and relatively light in weight. Because of their portable nature, lap-top computers are usually configured differently then most other personal computer systems. A lap-top computer is usually a single, integrated, unit. All of the elements of the computer are placed within one housing. This is in contrast to most personal computer systems where the elements of the system, such as the keyboard, video display, and Central Processing Unit (CPU) are physically distinct entities. The integrated nature of lap-top computers is desirable because it enhances their portability.

Most lap-top computers have a main body section which contains all of the essential circuitry of the computer such as the CPU, the power supply, and data storage devices, such as a floppy or hard disk. Attached to the front of the main body section is a keyboard unit which allows a user to communicate with the computer. There is a top cover section which is placed over the keyboard unit. The cover section is connected to the main body section by a hinge. The hinge allows the cover to be opened upwards, revealing the keyboard.

The top cover performs several functions. First, when closed, it covers the keyboard, thus protecting the keys while the computer is being transported. The cover also usually holds the display unit of the lap-top. When the cover is lifted upwards, the display unit is visible to the user. In this manner, the display unit is also protected. The display unit can be a video monitor, a liquid crystal display, or any other equivalent device. Often, when the cover is rotated upwards the computer is turned on.

The cover is typically held in a closed position by means of a latch assembly. This latch locks the cover in the closed position. When the latch is manually released, the cover can be opened. In prior art devices, the latch assembly consists of two separate locking elements. These locking elements are most often located on the top of the cover, near the left and right edges of the computer. Typically, the locking elements must be released simultaneously to release the cover. In prior art devices it is not possible for a user to reach both locking elements with one hand. Thus, it is necessary for the user of a lap-top computer to use both hands to open the cover. At times, this may prove to be inconvenient. Another drawback of prior art latch assemblies is that having two separate locking elements adds to the overall complexity of the latch assembly and increases the manufacturing costs associated with the computer.

Since lap-top computers are by their very nature portable, they include a handle with which the user can pick up the computer. However, in prior art devices, the handle does not have any other functional use. It is simply "dead weight" which adds to the total weight of the computer. This extra weight is undesirable because lap-top computers are designed to be as light as possible so that they may be carried more easily.

SUMMARY OF THE INVENTION

The present invention overcomes the limitations of prior art latching devices by providing an improved handle and latch assembly for portable personal computers. The present invention integrates the computer's handle into the locking mechanism of the cover. This obviates the need for a separate handle, thus reducing the total weight and overall complexity of the computer system.

With the present invention, the handle is coupled to the latch assembly. To open the cover, the user grasps the handle and pushes it a slight distance toward the computer. Thus, the user is not required to use both hands to unlock the cover. This simplifies the use of the latch assembly.

The handle is slideably coupled to the cover of the personal computer. A locking member is moveably disposed within the cover. A pair of locking hooks extend out of the cover and engage with slots in the keyboard section of the computer. When the handle is moved inward, it contacts the locking member and moves it, thereby releasing the hooks, and allowing the cover to be opened.

BRIEF DESCRIPTION OF THE DRAWINGS

FIG. 4 shows a side arm element of the handle of the present invention.

FIG. 6 is a cross-sectional view of the support arm taken along the line 6—6.

FIG. 8 illustrates the slide member used in the present invention.

FIG. 9 is a cross-sectional view of the lower housing member taken along the line 6—6.

FIG. 10 is a cross-sectional view of the handle taken along the line 10—10

DETAILED DESCRIPTION OF THE PRESENT INVENTION

An improved handle and latch assembly for a portable personal computer is described. In the following description, numerous specific details, such as component shapes and arrangements are set forth in order to provide a more thorough understanding of the present invention. In other instances, well known details, such as manufacturing methods, are not described in detail so as not to obscure the present invention unnecessarily.

Figure 1:
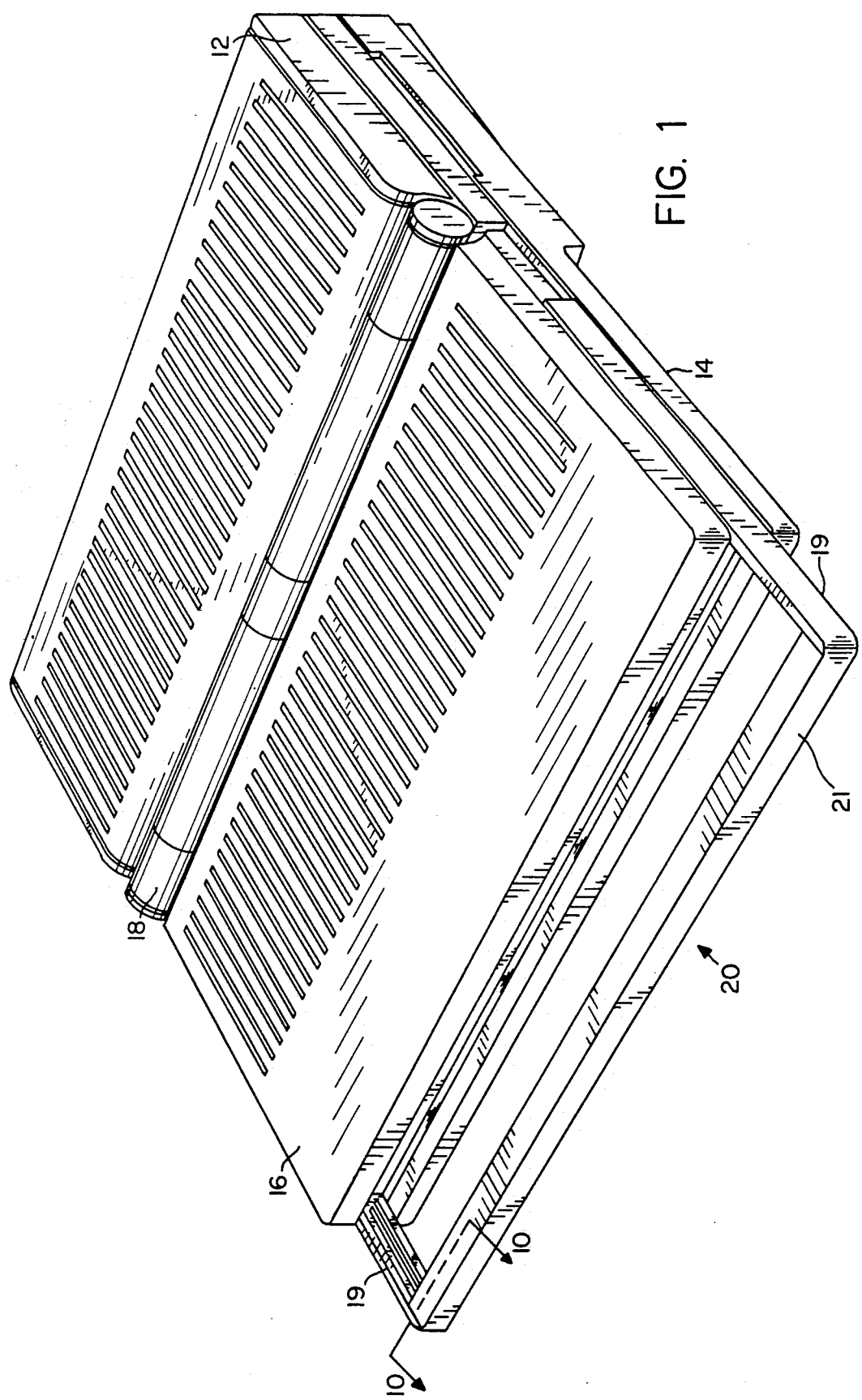
FIG. 1 illustrates a portable personal computer which utilizes the handle and latch assembly of the present invention.

Referring first to FIG. 1, a perspective view of a portable personal computer 10 which employs the handle and latch assembly of the present invention is shown. The computer 10 includes a main body 12 which contains the internal electronic circuitry of the computer. Attached to the front of the main body 12 is a keyboard unit 14. The keyboard unit 14 allows the user to communicate with the computer. Disposed over the keyboard unit 14 is a cover section 16. The cover section 16 is coupled to the main body 12 by a hinge 18. Hinge 18 extends completely across the width of the main body 12, as illustrated in FIG. 1. Although this specific hinge arrangement is illustrated, it will be appreciated by those skilled in the art that different types of hinges may be used with the present invention. The particular type of hinge arrangement that is used is not an element of the present invention.

Attached to the cover unit 16 is a handle 20. The handle 20 allows the computer to be easily carried. In the present invention, the handle is also connected to the latching mechanism for the cover 16. Handle 20 is not a unitary element. Instead, it is comprised of two side arms 19 and a center span 21. The center span 21 is coupled to the side arms 19 and is allowed to "float" to prevent any binding of the handle when it is pushed in and out. This element of the present invention is more fully described below with reference to FIG. 10.

Figure 2:
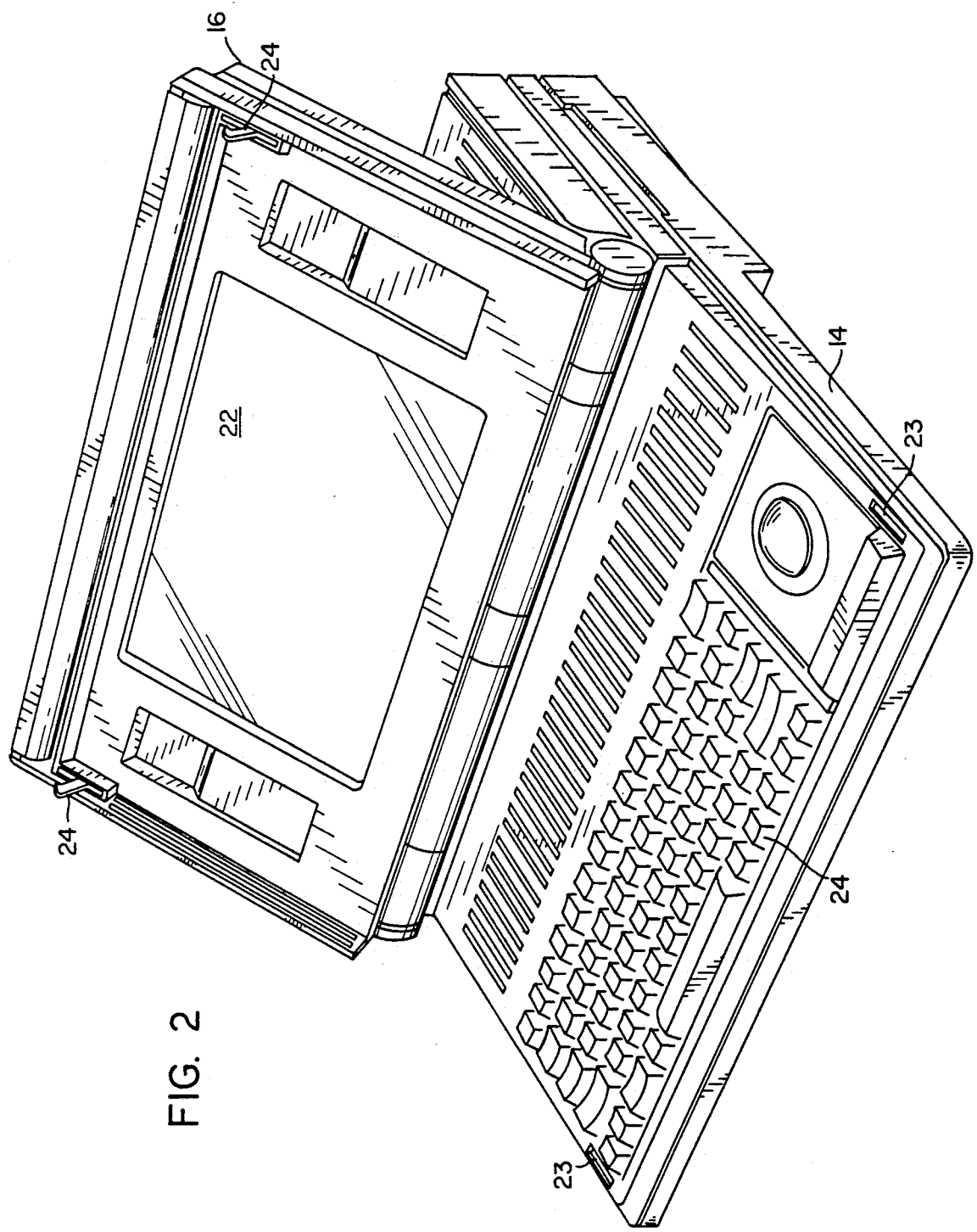
FIG. 2 illustrates a portable personal computer illustrating the cover in a raised position.

FIG. 2 is a perspective view of a portable personal computer 10 with the cover 16 in the raised position. As can be seen, when the cover 16 is raised, the display unit 22 and the keys 24 in the keyboard unit 14 are exposed. FIG. 2 also illustrates several elements of the latch assembly. Located in the keyboard section are two slots 23. Extending downward from the cover section are two hooks 24. When the cover 16 is closed, hooks 24 engage with corresponding slots 23 to hold the cover in place. The hooks are spring loaded so that they are biased towards the front of the cover 16. As used in this description, the front of the cover section 16 refers to that portion which is adjacent to the center span 21 of the handle 20, and opposite the hinge 18. This bias normally holds the hooks secured within slots 23. As is described more fully below, to release the hooks 24 from the slots 23, the handle 20 is pushed in. A mechanical assembly then releases the spring force, and moves the hooks away from the front of the cover. This frees the hooks 24 from the slots 23 and allows the cover section to be raised.

Figure 7:
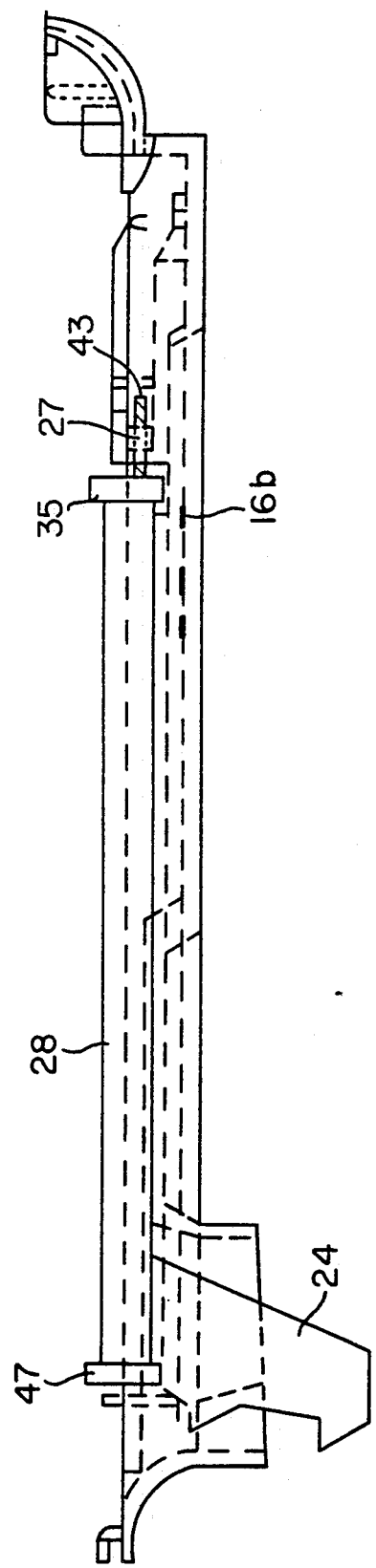
FIG. 7 is a partial cross-sectional view of the cover taken along the line 7—7.

The cover section 17 is actually made up of two separate elements. An upper housing member 16a and a lower housing member 16b join together to form the cover. In the preferred embodiment, the housing members are made from injection molded plastic, and are held together by a snap fit. FIGURE 7 is a partial cross-sectional view of the cover clearly showing upper and lower housing members. The interior of the cover is substantially hollow. The cover may hold the video display of the computer and other electronic circuitry for the computer's operation. In the present invention, the cover also contains the elements of the latch assembly which were not described above with reference to FIG. 2.

Figure 3:
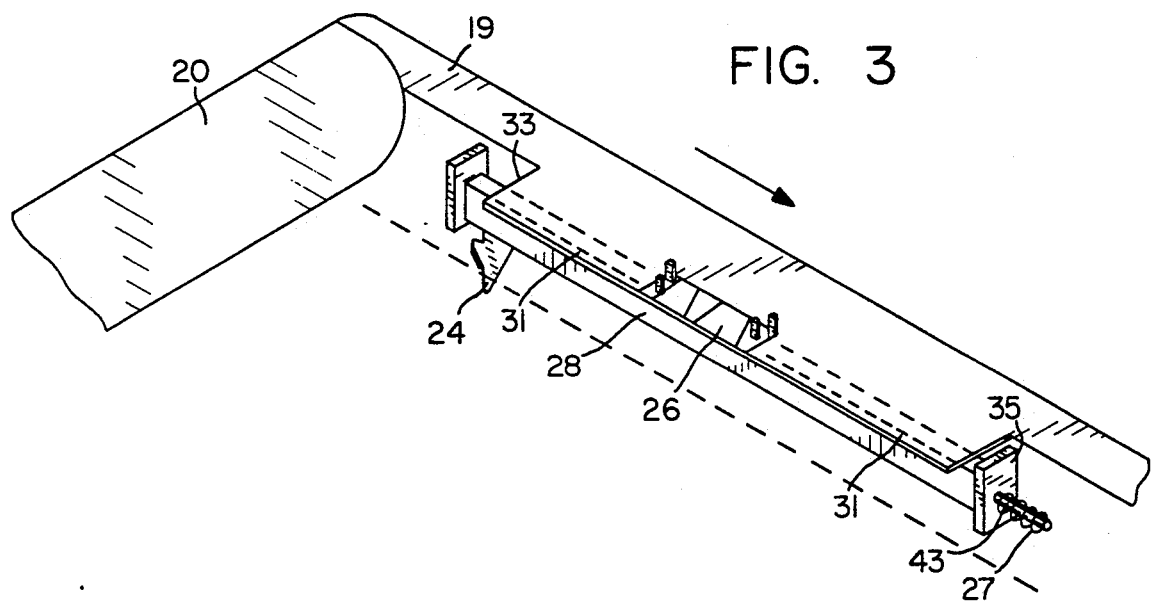
FIG. 3 illustrates the components of the latch assembly in assembled form, but without the surrounding cover.

Referring next to FIG. 3, a brief description of how the latch assembly of the present invention operates will be given. FIG. 3 shows several components of the latch assembly in their assembled form, but without the surrounding cover 16. In actual use, these elements would be mounted within the cover 16 and supported by various portions of the upper and lower housing members 16a and 16b. The components are illustrated without the cover in FIG. 3 in order to provide a more thorough understanding of the present invention.

The components which are shown in FIG. 3 are the side arm 19, friction pad 26, and slide member 28. The friction pad 26 is coupled to the side arm 19. The slide member 28 is not actually coupled to the friction pad 26 or the side arm 19. Instead, it is supported by the lower housing member (not shown) in the position illustrated—adjacent to, and slightly underneath the friction pad. FIG. 3 also shows that hooks 24 are actually part of the slide member 28. A spring 27 is shown which provides the necessary force to hold the slide member (and consequently the hooks 24) in the forward position. When the latch assembly is placed within the cover, spring 27 is held in place, and pushes against a portion of lower housing member 16b.

The operation of the latch assembly is a straightforward process. Normally, the cover 16 of the computer will be in a closed position. To release the hooks 24 from the slots 23, the user simply pushes the handle inward, in the direction indicated by the arrow in FIG. 3. As the handle moves inward, a contact point 33 of side arm 19 pushes against an upwardly extending tap 35 on the slide member. The force exerted by the user counteracts the spring force and moves the slide member 28 backwards until the hooks are free of the slots 23. The cover may then be opened.

The mechanical assembly which allows the motion of the handle 20 to unlock the cover 16 and its constituted components will now be described in greater detail with reference to FIGS. 4 through 10. Throughout the following description, various references are made to particular directions, such as left and right, and up and down. It is to be understood that these directions are given with reference to the associated drawings, and not to any absolute reference frame. When the invention is actually used it is anticipated that these directions will change, depending on the orientation of the personal computer.

FIG. 2 illustrates how handle 20 is connected to the cover 16. Side arm 19 is placed within a gap between the upper and lower housing numbers 16a and 16b. The side arm 19 is illustrated in perspective view in FIG. 4. FIG. 4 shows the support arm 19 which attaches to the left-hand side of the cover. The right hand support arm is a mirror image of FIG. 4. The side arm comprises an extended portion 30, two support tabs 31 and a locking extension 32. The locking extension is used to hold the center span 21 to the side arm. The support tabs 31 extend at a substantially right angle away from the extended portion 30 towards the center of the cover. In the preferred embodiment, the side arms are manufactured from injection-molded plastic.

Figure 5:
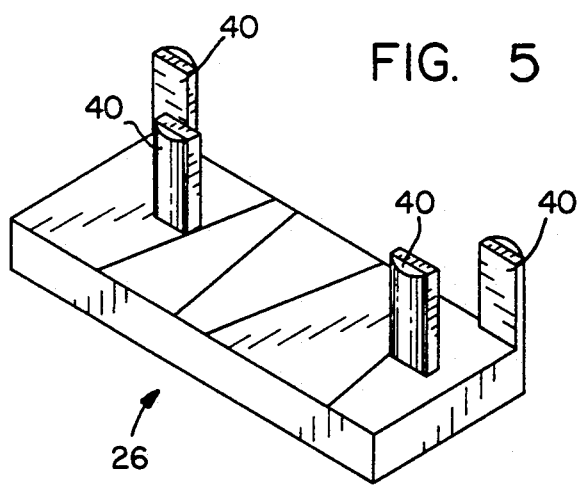
FIG. 5 shows the friction pad of the present invention.

Support tabs 31 are provided to engage with friction pad 26. Friction pad 26 is made from a material which can easily slide over the plastic components of the cover without any significant wear. In the preferred embodiment, the friction pad is made from Delrin. FIG. 5 illustrates the preferred embodiment of the friction pad. As with FIG. 4, the left hand friction pad is shown. The friction pad which attaches to the right hand side arm is a mirror image of the friction pad shown.

The friction pad 26 is coupled to the side arm 19 by inserting tab 35 in the friction pad into slot 34 in the support tabs 31. Slot 34 is most clearly shown in FIG. 6, which is a cross section of support arm 19 taken along the line 6—6. Referring again to FIG. 7, the relationship between the friction pad 26, side arm 19, and the upper and lower housing members 16a, 16b is shown. Each of the housing members has a pair of fingers 36 which extend into the hollow center of the cover. The fingers 36 form two slotted portions 38 and 39. Slotted portion 38 is in the upper housing member 16a, and slotted portion 39 is in the lower housing member 16b.

The length of the fingers 36 are chosen such that they do not completely fill the entire thickness of the cover 16. Instead, they leave a gap into which the friction pad 26 is placed. The fingers 36 serve to restrain the friction pad 26 from moving in a vertical direction. The friction pad further comprises compliant fingers 40 which extend upward from the base 41 of the friction pad 26. When the friction pad is properly placed within the cover 16, the compliant fingers 40 fit within slot 38. The fingers act to prevent the friction pad from moving left and right. However, the friction pad is free to move forward and back (or into and out of the plane of the paper of FIG. 6).

When a user moves the handle 20 in and out, the side arms cause the friction pads 26 to move. In turn, the friction pads 26 move over the fingers 36. The friction pads 26 are the only elements of the latch assembly which contact the cover. The friction pads 24 support the side arm 19 through the support fingers 31. In this manner, the side arms 19 do not actually come into direct sliding contact with any element of the cover. This reduces the frictional force exerted on the handle 20, and hence minimizes the amount of force necessary to move the handle.

FIG. 8 illustrates one of the slide members 28 used in the present invention. Slide number 28 is a generally elongated member. In the preferred embodiment, it is manufactured from injection-molded plastic. Extending upwardly from the main body 41 of the slide member are two tabs 35, 47. These tabs serve as contact points when the side arm 19 is moved. As previously noted, hook 24 descends from the main body 41 of the slide member 28. Coupled to the end of slide member 28 opposite hook 24 is a cylindrical protrusion 43. This cylindrical protusion provides a mounting point for spring 27. (Not shown in FIG. 8.)

FIG. 9 is a cross-section of lower housing member 16b showing how slide member 28 is mounted within the cover. As shown, slide member 28 is placed in slot 39 forced by fingers 36, with hook 24 passing through opening 45. Spring 27 is mounted over cylindrical protusion 43 and pushes against physical step 49.

When handle 20 is moved inward, contact point 33 makes contact with tab 35, thus moving slide member 28 towards the rear of the cover. When the handle is pulled out, however, contact point 35 contacts tab 47. Since spring 27 is already holding slide member in the forward position, tab 47 acts as an additional safety lock. With handle 20 pulled out, tab 47 prevents slide member 28 from moving. This insures that hook 24 remains engaged with slot 23, and does not accidentally allow the cover to open.

Another aspect of the present invention is the manner in which the center span 21 is coupled to the side arms 19. Since the handle is intended to slide relative to the cover, it is important that it move freely, without binding. If all of the components of the handle were rigidly fixed together, the handle could easily become stuck if one side arm 19 were pushed in farther than the other. To overcome this problem, the center span 21 is not rigidly fixed to the side arms, but is allowed to "float" a small amount, thereby giving extra clearance to the center span, and allowing the side arms 19 to move somewhat independently of each other.

As best shown in FIG. 10, center span 21 is essentially a hollow member which attaches to the side arms 19 by snapping over extended portion 32. The center span may also include a stiffener, such as a length of metal, to provide added support while the computer is being carried. If included, this stiffener is located within the hollow center span. This manner of assembly also allows for irregularities in the manufacture of the cover 16 and handle components. Because of process variations, the cover may not always have the same width. By allowing the center span to float, the side arms can freely adjust to the proper width. This prevents any bowing or other deformities in the side arms which would occur if the handle was a single, rigid, structure.

The foregoing has provided a description of an improved handle and latch assembly for a portable personal computer. The present invention has been described with respect to a specific exemplary embodiment thereof. It will be appreciated by those skilled in the art that variations from this embodiment can be made without departing from the overall spirit and scope of the present invention. Some of these variations have been described. Others are possible. The foregoing description, therefore, is to be regarded as illustrative rather than restrictive. The full scope of the invention is only determined by the following claims.

What is claimed is:

1. An improved handle and latch assembly for a portable personal computer comprising:

a handle means slideably coupled to a cover of said computer;

a latching means moveably disposed with said cover and extending partially out of said cover, said latching means engaging with an opening disposed on said computer such that when said latching means is engaged with said opening said cover is locked in a first position;

wherein when said handle slides in a first direction, said handle contacts and moves said latching means thereby disengaging said latching means from said opening and allowing said cover to be moved away from said first position.

2. The device as described in claim 1 further comprising a spring, said spring being disposed within said cover and exerting a force on said latching means so as to bias said latching means in a direction substantially opposite to said first direction.

3. The device as described in claim 1 wherein when said handle is moved in said first direction, said handle moves in a substantially horizontal plane towards said computer.

4. The device as described in claim 1 wherein said handle and said latching means are made from injection-molded plastic.

5. In a portable personal computer having a main body section, a keyboard section and a cover hingably coupled to said main body section and disposed over said keyboard section, an improved handle and latch assembly comprising:

a handle comprising a center span and first and second side arms, said first side arm being slideably coupled to a first side edge of said cover and said second side arm slideably coupled to a second side edge of said cover;

friction pads coupled to each of said side arms and disposed within said cover;

slide members disposed within said cover, each of said slide members being located substantially underneath and adjacent to said friction pads, each of said slide members having an upwardly extending tab and a downwardly extending hook, said hook passing through a hole in said cover such that when said cover is in a first position, each of said hooks engage with a slot located on said keyboard section so as to latch said cover in said first position;

said handle being adapted to move in a first direction such that a contact point on each of said side arms contacts said tab and moves each of said slide members in said first direction, thereby disengaging each of said hooks from said slots and allowing said cover to be moved from said first position to a second position.

6. The device as claimed in claim 5 wherein said cover is coupled to said main body by a hinge.

7. The device as claimed in claim 5 wherein when said cover is in said first position said cover is closed, and wherein when said cover is in said second position said cover is open, thereby exposing said keyboard unit to a user of said portable personal computer.

8. The device of claim 5 wherein said cover is comprised of an upper housing member and a lower housing member wherein said slide member is supported within a slot disposed in said lower housing member.

9. The device of claim 5 further comprising a spring disposed in said lower housing member, said spring exerting a force on said slide member such that said slide member is biased towards a front edge of said cover.

10. The device of claim 5 wherein said side arms, said cover section, and said slide member are made from injection-molded plastic.

11. The device of claim 5 wherein said friction pad is made from Delfin.

12. In a portable personal computer having a main body section, a keyboard section and a cover hingably coupled to said main body section and disposed over said keyboard section, an improved handle and latch assembly comprising:

a handle comprising a center span and first and second side arms, said first side arm being slideably coupled to a first side edge of said cover and said second side arm slideably coupled to a second side edge of said cover;

slide members disposed within said cover, each of said slide members having an upwardly extending tab and a downwardly extending hook, said hook passing through a hole in said cover such that when said cover is in a first position, each of said hooks engage with a slot located on said keyboard section so as to latch said cover in said first position;

said handle being adapted to move in a first direction such that a contact point on each of said side arms contacts said tab and moves each of said slide members in said first direction, thereby disengaging each of said hooks from said slots and allowing said cover to be moved from said first position to a second position.

13. An improved handle and latch assembly as in claim 12 wherein there are two slide members, one slide member being located on one side of the computer and the other side member being located on the opposite side of the computer.

* * * * *